March 2, 1954  C. D. PERRY  2,671,012
DEVICE FOR UTILIZING GAS FUMES FROM GASOLINE TANKS
Filed April 6, 1950

INVENTOR.
Claud D. Perry.
BY
Samuel H. Davis.
ATTORNEY.

Patented Mar. 2, 1954

2,671,012

UNITED STATES PATENT OFFICE 2,671,012

DEVICE FOR UTILIZING GAS FUMES FROM GASOLINE TANKS

Claude D. Perry, Nashville, Mich.

Application April 6, 1950, Serial No. 154,384

1 Claim. (Cl. 48—180)

This invention relates to combustion engines, is particularly concerned with accessories for combustion engines, and is more particularly concerned with a device by the use of which the hydrocarbons in the form of gaseous vapor present in the gasoline tank is utilized for operating the engine.

The history of the automobile industry is exceedingly crowded with devices which are intended for the conservation of fuel. These devices are popularly known as gas savers, and are advertised and sold to automobile owners with exaggerated claims. All of these devices are supposedly adapted to be installed in connection with the engine of an automobile, a truck or tractor, and are supposedly intended for decreasing the fuel intake of the internal combustion engine. It is noteworthy, however, that none of these devices have been thought to have sufficient merit to be incorporated by engine manufacturers as conventional parts of the engines. It is obvious that most of these were without merit. It is obvious also that the approach to the problem of fuel conservation has been erroneous. No attempt has been made to actually conserve the fuel that normally goes to waste in the act of evaporation. I have, however, concentrated my efforts in that direction and have developed a device for the conservation of fuel which normally has heretofore gone to waste.

It is therefore an object of the present invention to provide a device for the conservation of fuel for the operation of gasoline engines. It is a further object of the present invention to provide a device for the conservation of fuel by utilizing the hydrocarbons present in the gaseous state in the gasoline tank of a motor vehicle. It is still a further object to provide a device for utilizing the fuel present in the gaseous state in the gasoline tank by directing its flow into the manifold of the engine.

I have now discovered a device whereby the gaseous hydrocarbons present in the gasoline tank may be diverted from escaping by directing the same to the manifold of the combustion engine and I am now able to avoid the disadvantages of the prior art and am able readily to accomplish the objects set forth.

While some of the more outstanding features, and advantages of this invention have been hereinbefore indicated, others will become apparent from the following disclosures, taken in conjunction with the accompanying drawing, in which.

Figure 2:
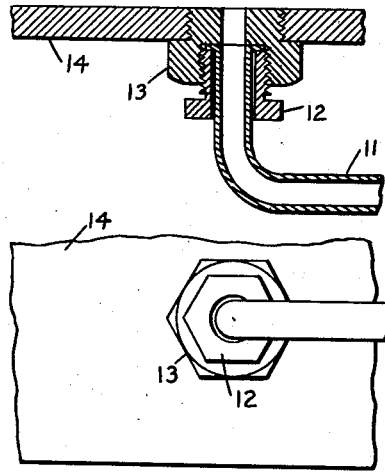
Fig. 2 is a top view of my invention and a partial section of the intake manifold of a combustion engine.
Figure 1:
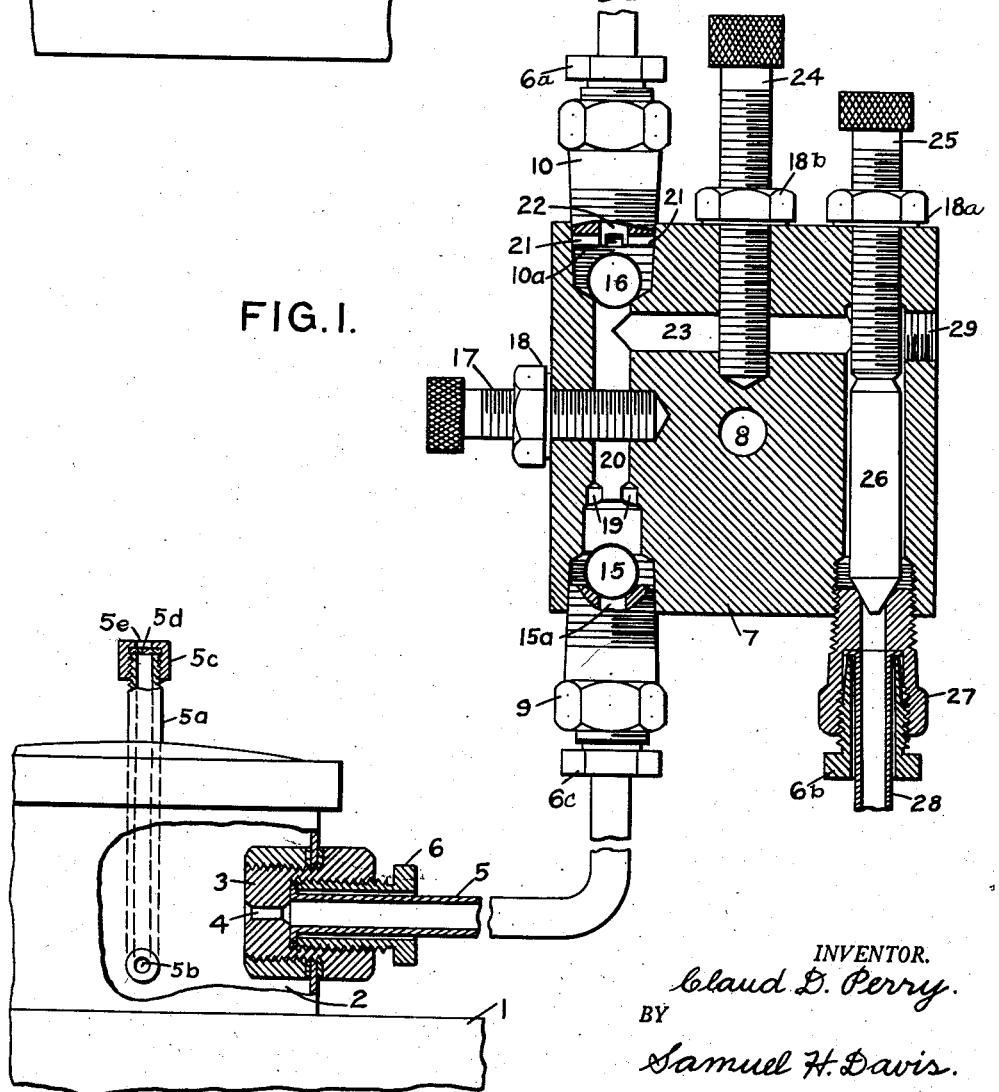
Fig. 1 is an elevation view of a portion of the gasoline tank, the tank neck, and connection to my device; a sectional elevation view of my device, and an elevation view of a portion of the intake manifold of an internal combustion engine.

Referring now to the drawings illustrated by the Figs. 1 and 2, the gasoline tank is shown with its neck 2 and the manner of connecting the device to it. An opening in the side of the neck of the tank is made to allow for the insertion of the inlet gland 3. The pipe retainer 6 secures the flexible copper pipe 5 to the said tank by means of the said gland, and another pipe retainer 6c secures the other end of the same pipe to the inlet gland 9.

The body of the device for conserving fuel is designated by the numeral 7. The said body is constructed of brass. The hole 8 is adapted for securing the body 7 to some member of the car, but preferably a member beneath the hood of the car. The gland 10 is an outlet gland through which the fuel leaves the device and passes through the tube 11 to the intake manifold 14 of the car. The pipe retainer 6a secures one end of the tube 11 to the gland 10. The inner surface of the gland 10 is designated by the numeral 10a. The pipe 11 is retained in the intake manifold by means of the retainer 12 and the gland 13. The upper portion of the gland 9 at which end the hole 15a is present has also a ball check valve 15. The gland 10 likewise has a ball check valve 16. The screw valve 17 is threadably secured into the side of the body of the device and may be set in place by the nut 18. The numeral 19 designates the two inlet ports. The passage way 20 leads from the inlet ports 19 to the opening in the gland 10. The path of the hydrocarbon vapor flow is, therefore from the tank 1 through the hole 4 in the inlet gland 3, through the tube 5, through the gland 9, through the inlet hole 15a, around the ball valve 15, through the inlet ports 19, through the passage way 20, around the ball valve 16, through the outlet ports 21, through the hole 22, through the tube 11 and into the intake manifold 14.

The tube 28 at the bottom of the body of the fuel conservation device is secured to the said body by means of the air gland 27, by means of the retainer 6b. The cylinder valve 26 is loosely held in one of the air intake passage ways. The location of the valve 26 is determined by the depth in which the adjusting screw 25 is set. The screw 25 may be set in place by means of the nut 18b. The closing plug 29 is threadably held in the threaded hole in the body 7. The screw valve 24 is threadably held in a threaded hole in the body 7 and may be set in place by means of the nut 18a. The path of the flow of air which is drawn into the system is, therefore, through the tube 28, around the point of the valve 26, around the body of the valve 26, around the bottom portion of the adjusting screw 25, through the passage way 23, around the screw valve 24, and continues through the passage way 23, and into the upper passage way 20 where it is mixed with the gaseous vapor of the gasoline, and passes through to the manifold of the combustion engine.

A means of air inlet into the gas tank is provided by means of the air inlet pipe 5a. The said pipe is secured to the cap of the tank at 5b. A cap 5c is secured to the outer end of the said pipe by means of threads. The numeral 5e designates an opening in the said cap. A screen 5d is disposed between the opening 5e and the top of the pipe.

As shown in the Fig. 1 of the drawing, all of the valves are shown in closed position. For operation the valve 17 is opened, the valve 24 is opened, the valve 25 is opened. As soon as the motor is started vacuum is produced in the manifold and a partial vacuum is created in the tube 11, and in the outlet hole 22. The valve 16 moves upwardly into the lower surface 10a. Regardless where the valve 16 rests against the surface 10a, two or more ports 21 will be open for upward flow of hydrocarbon vapor. The valve 15 moves upwardly to allow for the passage of the vapor. The air for the combustion of the vapor can be taken from the open air, but it is preferable that it be taken from an air filter which is not shown.

I wish to point out that I have been using the device of my invention on cars of several makes and models and that I am able to show a saving of as much as thirty and more per cent over that normally used. I am able to get more mileage from the gasoline in both slow and fast driving.

Having clearly set forth the construction, utility and advantages of my invention I wish particularly to state that it will be apparent that changes in the details of the construction and arrangement of the various members of the invention may be resorted to without departing from the spirit and scope of the invention as hereinafter claimed.

I claim:

A device for conserving gaseous hydrocarbons from a gasoline tank comprising a body, a vapor inlet tube, the said body having a vapor passage leading therethrough, the said vapor inlet tube being connected to and in alignment with a lower opening of the vapor passage, the said body having an air intake passage, the air intake passage leading from the open air through the said body and terminating in the vapor passage, an inlet ball valve, an outlet ball valve, the said inlet ball valve being seated substantially near the lower portion of the vapor passage, the said outlet ball valve being seated substantially near the upper portion of the vapor passage, an outlet tube, the said outlet tube being connected to and in alignment with an upper opening of the vapor passage, a vapor passage screw valve, the said vapor passage screw valve being disposed threadably in a threaded hole in the said body and intersecting the vapor passage, a cylinder valve, the said cylinder valve being disposed threadably in a threaded hole in the said body and intersecting the air passage, a screw valve, the said screw valve being held threadably in a threaded hole in the said body and being partially disposed in the air passage.

CLAUDE D. PERRY.

References Cited in the file of this patent

UNITED STATES PATENTS

| Number | Name | Date |
| --- | --- | --- |
| 1,381,331 | Pohl | June 14, 1921 |
| 1,422,987 | Keith et al. | July 18, 1922 |
| 1,490,581 | Bell | Apr. 15, 1924 |
| 1,551,130 | Bliffert | Aug. 25, 1925 |
| 1,806,790 | Dasey | May 26, 1931 |
| 1,874,238 | Callahan | Aug. 30, 1932 |